US012776067B2

(12) United States Patent
Park et al.

(10) Patent No.: US 12,776,067 B2
(45) Date of Patent: Oct. 27, 2026

(54) CAMERA CALIBRATION DEVICE AND METHOD USING AUTOMATIC RECOGNITION OF CALIBRATION PATTERN

(71) Applicant: Korea Electronics Technology Institute, Seongnam-si (KR)

(72) Inventors: Woo Chool Park, Incheon (KR); Jun Hwan Jang, Goyang-si (KR); Jin Wook Yang, Uijeongbu-si (KR); Min Su Choi, Seoul (KR); Jun Suk Lee, Seoul (KR); Bon Jae Koo, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 19/046,752

(22) Filed: Feb. 6, 2025

(65) Prior Publication Data

US 2025/0182332 A1 Jun. 5, 2025

Related U.S. Application Data

(63) Continuation of application No. PCT/KR2022/017953, filed on Nov. 15, 2022.

(30) Foreign Application Priority Data

Aug. 9, 2022 (KR) ........................ 10-2022-0099072

(51) Int. Cl.
*G06T 7/80* (2017.01)
*G06V 10/44* (2022.01)
*G06V 10/74* (2022.01)

(52) U.S. Cl.
CPC ...................................... *G06T 7/80* (2017.01)

(58) Field of Classification Search
CPC ........... G06T 7/80; G06T 7/85; H04N 17/002; G01B 21/042; G01C 15/02; G06V 10/44; G06V 10/74
See application file for complete search history.

(56) References Cited

U.S. PATENT DOCUMENTS 7,492,476 B1 * 2/2009 Dodge ...................... G06T 7/73 358/1.18
9,734,419 B1 * 8/2017 Ye ............................ G06T 7/85
(Continued)

FOREIGN PATENT DOCUMENTS

CN 113034604 A 6/2021
JP 06325154 A 11/1994
(Continued)

OTHER PUBLICATIONS

Translation of Priority Document To US20240013438 (Which Has Priority To KR-10-2022-0084960 (Jul. 11, 2022) Via KR-10-2022-0127954. (2022).*

*Primary Examiner* — Brian P Yenke
(74) *Attorney, Agent, or Firm* — NSIP Law

(57) ABSTRACT

Disclosed herein are a method and apparatus for a camera calibration. According to an embodiment, the method for the camera calibration may include a recognition unit configured to recognize a captured calibration pattern, a selection unit configured to select, among a plurality of preset calibration algorithms, a calibration algorithm corresponding to the recognized calibration pattern and an execution unit configurated to perform camera calibration by using the selected calibration algorithm and the captured calibration pattern.

9 Claims, 6 Drawing Sheets

(56) References Cited

U.S. PATENT DOCUMENTS

| | | | | |
|---|---|---|---|---|
| 12,327,379 | B2 * | 6/2025 | Choi | G06T 7/70 |
| 2014/0098243 | A1 * | 4/2014 | Ghazizadeh | G01N 35/1095 348/187 |
| 2018/0367681 | A1 * | 12/2018 | Xu | G06T 7/85 |
| 2019/0311494 | A1 | 10/2019 | Ramalingam et al. | |
| 2020/0202567 | A1 * | 6/2020 | Fitzgibbon | G06T 7/80 |
| 2021/0349525 | A1 * | 11/2021 | Shi | G02B 27/017 |
| 2022/0299314 | A1 * | 9/2022 | Xu | G06T 7/521 |
| 2022/0358679 | A1 * | 11/2022 | Chen | G06T 7/73 |
| 2022/0408067 | A1 * | 12/2022 | Tsai | H04N 23/56 |
| 2023/0154123 | A1 * | 5/2023 | Shi | G06F 3/011 345/419 |
| 2023/0254568 | A1 * | 8/2023 | Iermolenko | H04N 17/002 348/207.99 |
| 2023/0316572 | A1 * | 10/2023 | Danziger | G06V 10/44 348/164 |
| 2023/0362339 | A1 * | 11/2023 | Chen | G06T 7/11 |
| 2024/0013438 | A1 * | 1/2024 | Kang | G06T 7/80 |
| 2026/0141673 | A1 * | 5/2026 | Hackenbroich | G06V 10/44 |

FOREIGN PATENT DOCUMENTS

| | | | |
|---|---|---|---|
| JP | 2008-289880 | A | 12/2008 |
| JP | 2009-036589 | A | 2/2009 |
| KR | 10-1691880 | B1 | 1/2017 |
| KR | 10-2018-0105875 | A | 10/2018 |
| KR | 10-2311719 | B1 | 10/2021 |

* cited by examiner

CAMERA CALIBRATION DEVICE AND METHOD USING AUTOMATIC RECOGNITION OF CALIBRATION PATTERN

CROSS REFERENCE TO RELATED APPLICATION

The present application is based on International Patent Application No. PCT/KR2022/017953 filed on Nov. 15, 2022, which claims priority to a Korean patent application No. 10-2022-0099072 filed on Aug. 9, 2022, the entire contents of which are incorporated herein for all purposes by this reference.

TECHNICAL FIELD

The present disclosure relates to a camera calibration apparatus and method, and particularly, to an apparatus and method for performing camera calibration by automatically recognizing a calibration pattern and using a calibration algorithm corresponding to the automatically recognized calibration pattern.

BACKGROUND

The camera is a device frequently used for capturing images or videos. Data captured by a camera is used for various purposes and in different contexts. For example, a wearable device may include one or more on-board cameras to provide image data of the surrounding environment of a user of the wearable device. As an example, stereoscopic wearable glasses feature two forward-oriented cameras that are configured to capture images for presenting augmented reality to a user through stereoscopic displays. Such wearable glasses may also include backward-oriented cameras for capturing images of the user's eyes.

Camera calibration is often performed to ensure not only the precision and accuracy of a camera but also information extracted from image data captured by the camera. A camera calibration process determines true parameters of a camera device that generates an image, and this enables calibration data of the camera like intrinsic parameters and extrinsic parameters to be determined. Intrinsic parameters include a focus, a focal length, a principal point and a distortion coefficient. Extrinsic parameters include position relations among multiple cameras and translation and rotation offsets among sensors.

Such camera calibration is one of the preliminary necessary processes common to intelligent image systems and CCTV applications.

SUMMARY

The present disclosure is technically directed to providing an apparatus and method for performing camera calibration by automatically recognizing a calibration pattern and using a calibration algorithm corresponding to the automatically recognized calibration pattern.

Other objects and advantages of the present disclosure may be understood through the following description and be known more clearly by the embodiments of the present disclosure. In addition, it may be easily understood that the objects and advantages of the present disclosure can be implemented by the means described in the appended claims and a combination thereof.

According to the present disclosure, a device is provided for camera calibration apparatus. The device may include a recognition unit configured to recognize a captured calibration pattern, a selection unit configured to select, among a plurality of preset calibration algorithms, a calibration algorithm corresponding to the recognized calibration pattern and an execution unit configured to perform camera calibration by using the selected calibration algorithm and the captured calibration pattern.

According to the embodiment of the present disclosure, wherein the recognition unit is further configured to calculate a degree of similarity between a plurality of pre-stored calibration patterns and the captured calibration pattern and recognize a calibration pattern with a highest degree of similarity as the captured calibration pattern and wherein the selection unit is further configured to select a calibration algorithm corresponding to the calibration pattern with the highest degree of similarity.

According to the embodiment of the present disclosure, wherein the recognition unit is further configured to calculate a degree of similarity between a plurality of pre-stored calibration patterns and the captured calibration pattern, and recognize a calibration pattern with a highest degree of similarity as the captured calibration pattern, and wherein the selection unit is further configured to select a calibration algorithm corresponding to the calibration pattern with the highest degree of similarity.

According to the embodiment of the present disclosure, wherein the selection unit is further configured to determine whether or not the calculated degree of similarity is equal to or greater than a preset reference degree of similarity, and when the calculated degree of similarity is equal to or greater than the preset reference degree of similarity, recognize the calibration pattern with the highest degree of similarity as the captured calibration pattern.

According to the embodiment of the present disclosure, wherein the recognition unit is further configured to extract a feature point of the captured calibration pattern, compare the extracted feature point and a feature point of each of the plurality of pre-stored calibration patterns, and recognize a most similar calibration pattern to the captured calibration pattern among the plurality of calibration patterns.

According to the embodiment of the present disclosure, wherein further comprises a provision unit configured to provide a performance result of the camera calibration.

According to the present disclosure, a device is provided for camera calibration apparatus. The device may include a recognition unit configured to recognize a captured calibration pattern by comparing the captured calibration pattern and a plurality of pre-stored calibration patterns a computation unit configured to calculate calibration result values for preset calibration algorithms respectively by using each of the calibration algorithms and the captured calibration pattern, when there is no calibration pattern corresponding to the captured calibration pattern in the plurality of calibration patterns a selection unit configured to select a calibration algorithm corresponding to a best calibration result value among the calculated calibration result values and an execution unit configured to perform camera calibration by using the selected calibration algorithm and the captured calibration pattern.

According to the embodiment of the present disclosure, wherein the selection unit is further configured to select a calibration algorithm with a smallest calibration error value among calibration error values included in the calibration result values.

According to the present disclosure, a method for camera calibration, the method may include recognizing a captured calibration pattern by comparing the captured calibration pattern and a plurality of pre-stored calibration patterns, selecting, among a plurality of preset calibration algorithms, a calibration algorithm corresponding to the recognized calibration pattern and performing camera calibration by using the selected calibration algorithm and the captured calibration pattern.

According to the embodiment of the present disclosure, wherein the recognizing of the captured calibration calculates a degree of similarity between the plurality of calibration patterns and the captured calibration pattern and recognizes a calibration pattern with a highest degree of similarity as the captured calibration pattern.

According to the embodiment of the present disclosure, wherein the recognizing of the captured calibration extracts a feature point of the captured calibration pattern, compares the extracted feature point and a feature point of each of the plurality of calibration patterns, and thus recognizes a most similar calibration pattern to the captured calibration pattern among the plurality of calibration patterns.

According to the embodiment of the present disclosure, wherein the method further comprises determining whether or not there is a calibration pattern corresponding to the captured calibration pattern among the plurality of calibration patterns, wherein the selecting of the calibration algorithm selects the calibration algorithm corresponding to the recognized calibration pattern, when the calibration pattern corresponding to the captured calibration pattern is present.

According to the embodiment of the present disclosure, wherein the method further comprises calculating calibration result values for the calibration algorithms respectively by using each of the calibration algorithms and the captured calibration pattern, when there is no calibration pattern corresponding to the captured calibration pattern selecting a calibration algorithm corresponding to a best calibration result value among the calculated calibration result values and performing camera calibration by using the calibration algorithm corresponding to the best calibration result value and the captured calibration pattern.

According to the present disclosure, it is possible to provide an apparatus and method for performing camera calibration by automatically recognizing a calibration pattern and using a calibration algorithm corresponding to the automatically recognized calibration pattern.

The effects obtainable from the present disclosure are not limited to the above-mentioned effects, and other effects not mentioned herein will be clearly understood by those skilled in the art through the following descriptions.

DESCRIPTION OF THE PREFERRED EMBODIMENTS

Figure 1:
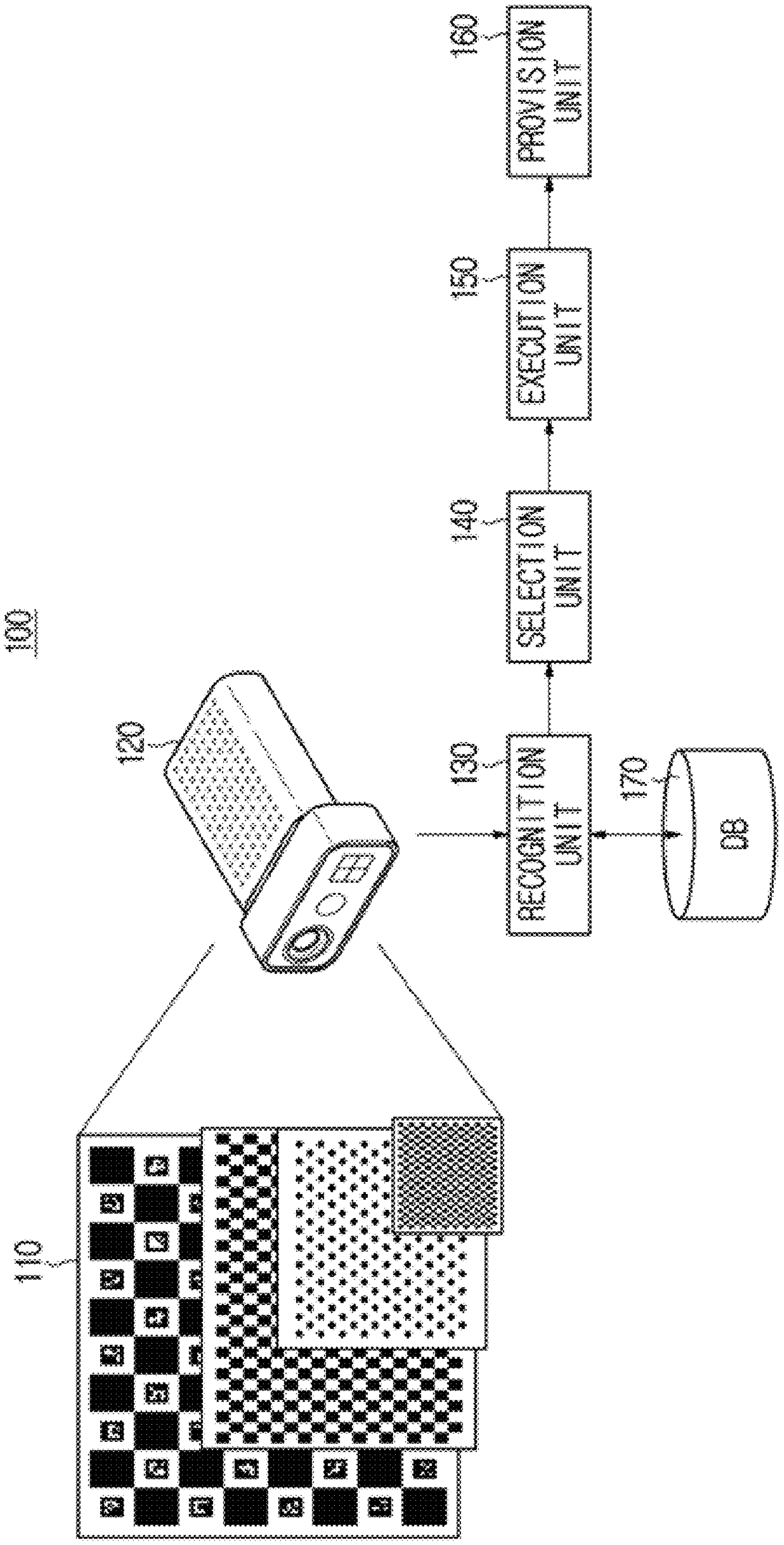
FIG. 1 shows a configuration of a camera calibration apparatus according to an embodiment of the present disclosure.

Hereinafter, examples of the present disclosure are described in detail with reference to the accompanying drawings so that those having ordinary skill in the art may easily implement the present disclosure. However, examples of the present disclosure may be implemented in various different ways and thus the present disclosure is not limited to the examples described therein.

In describing examples of the present disclosure, well-known functions or constructions have not been described in detail since a detailed description thereof may have unnecessarily obscured the gist of the present disclosure. The same constituent elements in the drawings are denoted by the same reference numerals and a repeated or duplicative description of the same elements has been omitted.

In the present disclosure, when an element is simply referred to as being “connected to”, “coupled to” or “linked to” another element, this may mean that an element is “directly connected to”, “directly coupled to”, or “directly linked to” another element or this may mean that an element is connected to, coupled to, or linked to another element with another element intervening therebetween. In addition, when an element “includes” or “has” another element, this means that one element may further include another element without excluding another component unless specifically stated otherwise.

In the present disclosure, the terms first, second, etc. are only used to distinguish one element from another and do not limit the order or the degree of importance between the elements unless specifically stated otherwise. Accordingly, a first element in an example may be termed a second element in another example, and, similarly, a second element in an example could be termed a first element in another example, without departing from the scope of the present disclosure.

In the present disclosure, elements are distinguished from each other for clearly describing each feature, but this does not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. In addition, examples including other elements in addition to the elements described in the various examples are also included in the scope of the present disclosure.

In the present disclosure, since expressions of positional relationships used in this specification, such as top, bottom, left, right, etc., are described for convenience of description, in the case of reverse viewing the drawings shown in this specification, the positional relationship described in the specification may be interpreted in the opposite way.

In the present disclosure, each of such phrases as “A or B,” “at least one of A and B” “at least one of A or B,” “A, B, or C” “at least one of A, B, and C” and “at least one of A, B, C" may include any one of, or all possible combinations of the items enumerated together in a corresponding one of the phrases.

The embodiments of the present disclosure are directed to performing camera calibration by automatically recognizing various calibration patterns for the camera calibration and using a calibration algorithm corresponding to the recognized calibration patterns.

FIG. 1 shows a configuration of a camera calibration apparatus according to an embodiment of the present disclosure.

Referring to FIG. 1, a camera calibration apparatus 100 according to an embodiment of the present disclosure includes a recognition unit 130, a selection unit 140, an execution unit 150, a provision unit 160 and a database (DB) 170.

The DB 170 is a means of storing data implemented in a camera calibration apparatus according to an embodiment of the present disclosure and stores a plurality of calibration patterns, a feature point for each of the calibration patterns, a calibration algorithm corresponding to each of the calibration patterns, and every type of data either for implementing camera calibration or related to camera calibration.

In order to perform camera calibration, the recognition unit 130 receives a calibration pattern 110 captured by a camera 120 and automatically recognizes a calibration pattern by comparing the captured calibration pattern and a plurality of calibration patterns that are stored in advance in the DB.

A calibration pattern captured by the camera 120 may be any one of calibration patterns stored in the DB 170 but is not limited thereto and may be a different calibration pattern from the calibration patterns stored in the DB 170.

According to an embodiment, the recognition unit 130 may calculate a degree of similarity between a plurality of calibration patterns stored in the DB 170 and a captured calibration pattern and recognize a calibration pattern with a highest degree of similarity as a captured calibration pattern.

Figure 3:
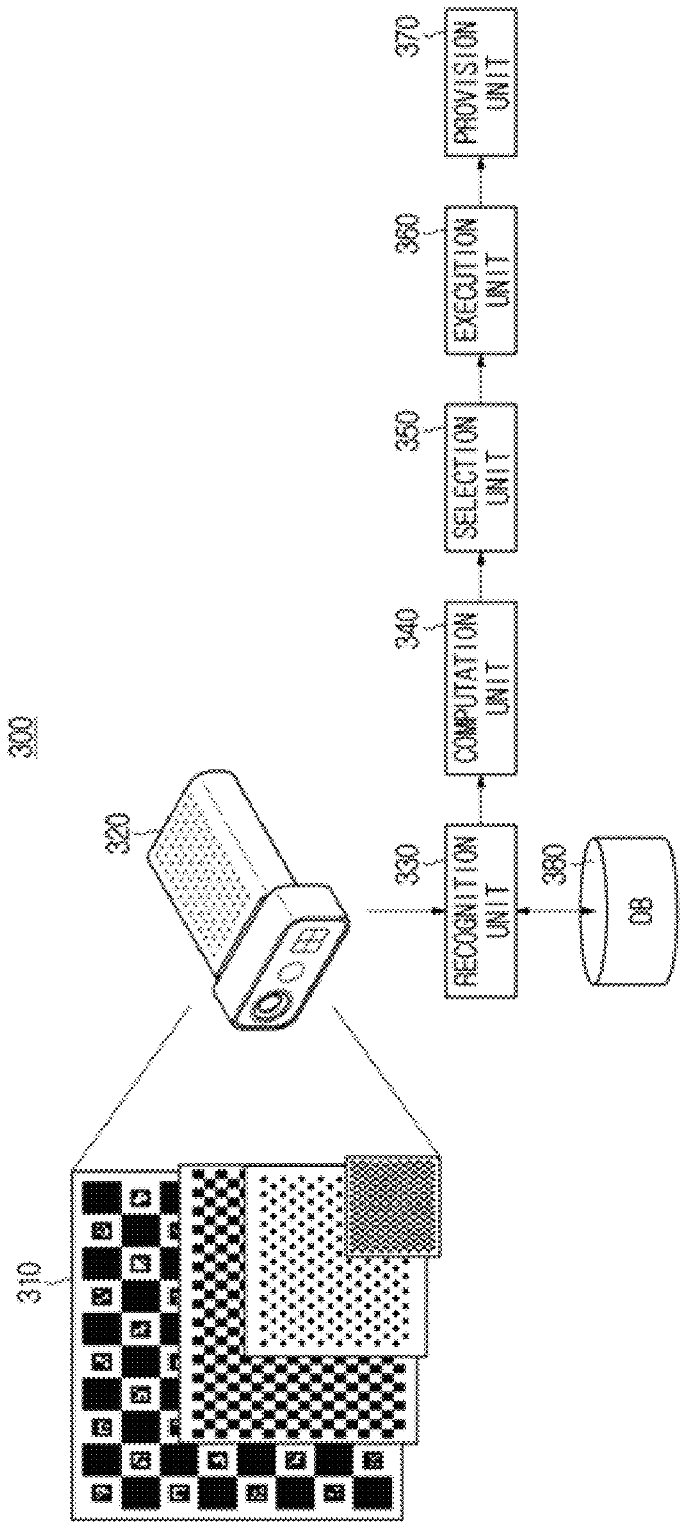
FIG. 3 shows a configuration of a camera calibration apparatus according to another embodiment of the present disclosure.

Herein, the recognition unit 130 may compare a calculated degree of similarity and a preset reference degree of similarity and recognize a calibration pattern with a highest degree of similarity among degrees of similarity above the reference degree of similarity as a captured calibration pattern. If a calibrated degree of similarity is lower than the reference degree of similarity, the recognition unit 130 may output a calibration error, determining that no calibration pattern corresponding to a captured calibration pattern is stored. FIG. 3 will describe in detail another operation in an apparatus of the present disclosure in case it is determined that no calibration pattern corresponding to a captured calibration pattern is stored.

According to an embodiment, the recognition unit 130 may extract a feature point of a captured calibration pattern, compare the extracted feature point and a feature point of each of a plurality of calibration patterns stored in the DB 170, and thus recognize a most similar calibration pattern among the plurality of calibration patterns to the captured calibration pattern.

The selection unit 140 selects, from a plurality of preset calibration algorithms, a calibration algorithm corresponding to a calibration pattern recognized by the recognition unit 130.

Figure 2:
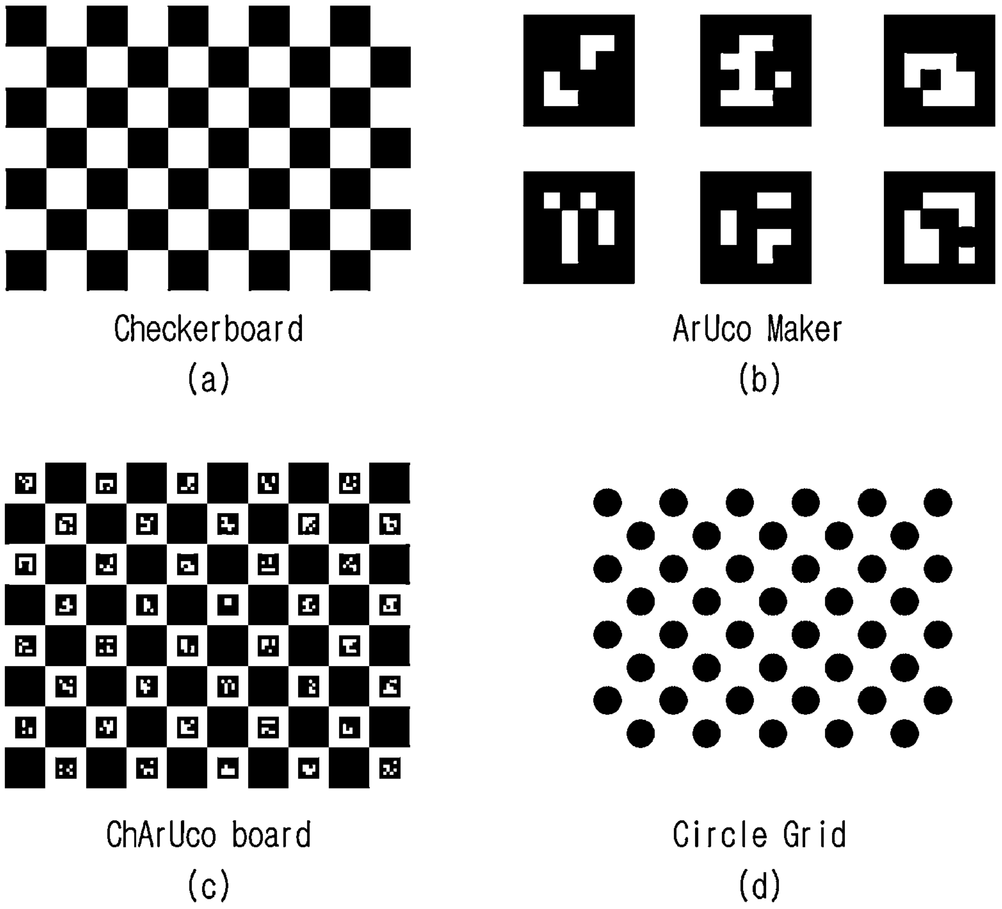
FIG. 2 shows examples of calibration patterns.

For example, as illustrated in FIG. 2, in case calibration patterns stored in the DB 170 are Chekerboard (FIG. 2*a*), ArUco Maker (FIG. 2*b*), ChArUco Board (FIG. 2*c*) and Circle Grid (FIG. 2*d*), and calibration algorithms corresponding to respective calibration patterns illustrated in FIG. 2 are a Chekerboard calibration algorithm, a ArUco Maker calibration algorithm, a ChArUco Board calibration algorithm and a Circle Grid calibration algorithm, when a calibration pattern captured by the recognition unit 130 is recognized as Chekerboard of FIG. 2*a*, the selection unit 140 may select the Chekerboard calibration algorithm that performs camera calibration by using Chekerboard.

That is, the selection unit 140 performs a function of selecting a calibration algorithm that will perform camera calibration by the execution unit 150, and such a function of the selection unit 140 may be included in the execution unit 150, if necessary.

The execution unit 150 performs camera calibration by using a calibration algorithm selected by the selection unit 140 and a captured calibration pattern and outputs a performance result of the camera calibration. That is, the execution unit 150 integrates different types of calibration according to each calibration pattern, performs camera calibration by using a calibration algorithm corresponding to a recognized calibration pattern among integrated various types of calibration algorithms, and thus outputs a camera calibration result value using a captured calibration pattern to the provision unit 160.

The provision unit 160 receives a result value of camera calibration performed by the execution unit 150 and provides the camera calibration result value.

Herein, the provision unit 160 may organize and provide a camera calibration result to a user and also provide a calibration result value according to a file format desired by the user such as txt file or csv file.

A camera calibration result value may include intrinsic parameters such as an internal camera matrix, a distortion coefficient, a rotation vector, and a translation vector and also include a calibration error value. Of course, the camera calibration result value is not limited to intrinsic parameters but may include all parameters that are calibrated by camera calibration.

FIG. 3 shows a configuration of a camera calibration apparatus according to another embodiment of the present disclosure.

Referring to FIG. 3, a camera calibration apparatus 300 according to an embodiment of the present disclosure includes a recognition unit 330, a computation unit 340, a selection unit 350, an execution unit 370, a provision unit 370 and a DB 380.

The DB 380 is a means of storing data implemented in a camera calibration apparatus according to an embodiment of the present disclosure and stores a plurality of calibration patterns, a feature point for each of the calibration patterns, a calibration algorithm corresponding to each of the calibration patterns, and every type of data either for implementing camera calibration or related to camera calibration.

In order to perform camera calibration, the recognition unit 330 receives a calibration pattern 310 captured by a camera 320 and automatically recognizes a calibration pattern by comparing the captured calibration pattern and a plurality of calibration patterns that are stored in advance in the DB.

A calibration pattern captured by the camera 320 may be any one of calibration patterns stored in the DB 380 but is not limited thereto and may be a different calibration pattern from the calibration patterns stored in the DB 380.

According to an embodiment, the recognition unit 330 may extract a feature point of a captured calibration pattern, compare the extracted feature point and a feature point of each of a plurality of calibration patterns stored in the DB 380, and thus recognize a most similar calibration pattern among the plurality of calibration patterns to the captured calibration pattern.

According to an embodiment, the recognition unit 330 may calculate a degree of similarity between a plurality of calibration patterns stored in the DB 380 and a captured calibration pattern and recognize a calibration pattern with a highest degree of similarity as a captured calibration pattern.

Herein, the recognition unit 330 may i) compare a calculated degree of similarity and a preset reference degree of similarity and recognize a calibration pattern with a highest degree of similarity among degrees of similarity above the reference degree of similarity as a captured calibration pattern, and ii) if a calibrated degree of similarity is lower than the reference degree of similarity, determine that no calibration pattern corresponding to a captured calibration pattern is stored.

In case the recognition unit 330 recognizes a calibration pattern as in i), an operation as shown in FIG. 1 above may be performed. That is, in the case of i), the selection unit 350, the execution unit 360 and the provision unit 370 may perform the functions of the selection unit 140, the execution unit 150 and the provision unit 160 of FIG. 1, and thus the case of i) will be omitted in the description of FIG. 3.

On the other hand, when the recognition unit 330 recognizes ii), that is, when stored calibration patterns do not include any calibration pattern corresponding to a captured calibration pattern, the computation unit 340, the selection unit 350, the execution unit 360 and the provision unit 370 may perform different operations from FIG. 1.

Hereinafter, the case of ii) will be described.

If the recognition unit 330 determines the case of ii), that is, if stored calibration patterns do not include any calibration pattern corresponding to a captured calibration pattern, the computation unit 340 calculates a calibration result value for each calibration algorithm by using each calibration algorithm and the captured calibration pattern.

For example, as illustrated in FIG. 2, in case calibration patterns stored in the DB 380 are Chekerboard (FIG. 2*a*), ArUco Maker (FIG. 2*b*), ChArUco Board (FIG. 2*c*) and Circle Grid (FIG. 2*d*), and calibration algorithms corresponding to the respective calibration patterns illustrated in FIG. 2 are a Chekerboard calibration algorithm, a ArUco Maker calibration algorithm, a ChArUco Board calibration algorithm and a Circle Grid calibration algorithm, the computation unit 340 may calculate, for a captured calibration pattern, a calibration result value for each of the Chekerboard calibration algorithm, the ArUco Maker calibration algorithm, the ChArUco Board calibration algorithm and the Circle Grid calibration algorithm.

Among a plurality of pre-stored calibration algorithms, the selection unit 350 selects a calibration algorithm corresponding to a best calibration result value among calculated calibration result values.

Herein, the selection unit 350 may select a calibration algorithm with a smallest calibration error value among calibration error values included in a calibration result value.

For example, if it is assumed that the Chekerboard calibration algorithm has a smallest calibration error value among calibration result values calculated by the computation unit 350 using the Chekerboard calibration algorithm, the ArUco Maker calibration algorithm, the ChArUco Board calibration algorithm and the Circle Grid calibration algorithm respectively, the selection unit 350 may select the Chekerboard calibration algorithm among the calibration algorithms.

The execution unit 360 performs camera calibration by using a calibration algorithm selected by the selection unit 350 and a captured calibration pattern and outputs a performance result of the camera calibration. That is, the execution unit 360 integrates different types of calibration according to each calibration pattern, performs camera calibration by using a calibration algorithm with a smallest calibration error value among integrated various types of calibration algorithms, and thus outputs a camera calibration result value using a captured calibration pattern to the provision unit 370.

The provision unit 370 receives a result value of camera calibration performed by the execution unit 360 and provides the camera calibration result value.

Herein, the provision unit 370 may organize and provide a camera calibration result to a user and also provide a calibration result value according to a file format desired by the user such as txt file or csv file.

FIG. 3 may be applied to a case in which calibration is performed by using a different pattern from a calibration pattern stored in a camera. For example, if a calibration pattern provided for the camera is lost, camera calibration may be performed by using another calibration pattern, and depending on situations, camera calibration may performed again by using the calibration pattern of the camera.

Thus, a camera calibration apparatus according to embodiments of the present disclosure may automatically recognize a captured calibration pattern and perform camera calibration by selecting a calibration algorithm corresponding to the automatically recognized calibration pattern.

In addition, a camera calibration apparatus according to embodiments of the present disclosure may camera calibration also through a different calibration pattern from a pre-stored calibration pattern, and thus camera calibration may be performed even when the calibration pattern of a corresponding camera is lost.

Figure 4:
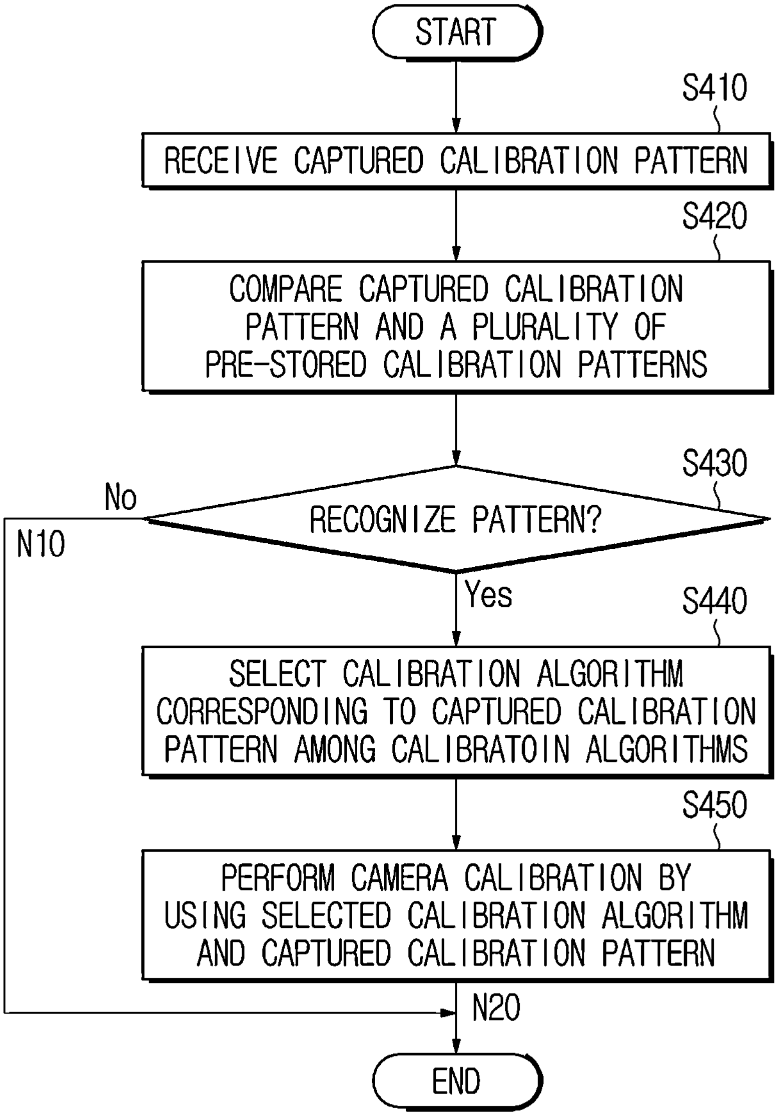
FIG. 4 shows an operation flowchart of a camera calibration method according to still another embodiment of the present disclosure.

FIG. 4 shows an operation flowchart of a camera calibration method according to still another embodiment of the present disclosure, and the operation flowchart corresponds to the apparatus of FIG. 1.

Referring to FIG. 4, a camera calibration method of the present disclosure receives a calibration pattern captured by a camera, compares the captured calibration pattern and a plurality of pre-stored calibration patterns, and thus determines whether or not the captured calibration pattern is recognized (S410, S420 and S430).

Herein, at step S420, a degree of similarity may be calculated between the plurality of calibration patterns and the captured calibration pattern, and the captured calibration pattern and the plurality of pre-stored calibration patterns may be compared by using the calculated degree of similarity.

Herein, at step S420, a feature point of the captured calibration pattern may be extracted, the extracted feature point may be compared with a feature point of each of the plurality of stored calibration patterns, and thus the captured calibration pattern and the plurality of pre-stored calibration patterns may be compared.

Herein, at step S430, a calibration pattern with a highest degree of similarity among degrees of similarity calculated through step S420 may be recognized as the captured calibration pattern. Specifically, a calculated degree of similarity and a preset reference degree of similarity may be compared, and a calibration pattern with a highest degree of similarity among degrees of similarity above the reference degree of similarity may be recognized as the captured calibration pattern.

That is, at step S430, it is determined whether or not the captured calibration pattern is included in the plurality of pre-stored calibration patterns, and if a stored calibration pattern is captured, the pattern may be determined to be recognized, and if a different calibration pattern from the stored calibration pattern is captured, pattern recognition failure may be determined.

As a result of the determination of step S430, if a captured calibration pattern is recognized as one of stored calibration patterns, among preset calibration algorithms, a calibration algorithm corresponding to the recognized or captured calibration pattern is selected, camera calibration is performed by using the selected calibration algorithm and the captured calibration pattern, and thus a performance result of the camera calibration is provided (S440 and S450).

Figure 5:
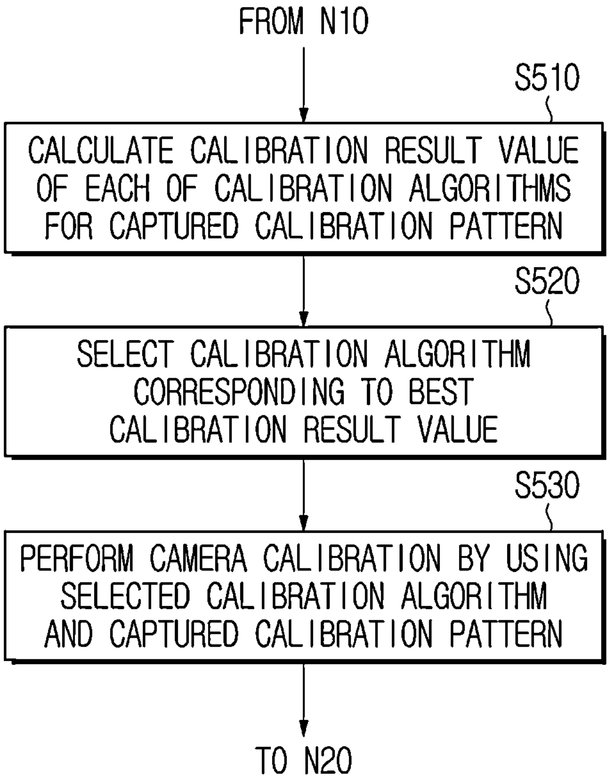
FIG. 5 shows an operation flowchart of an embodiment in which pattern recognition fails.

On the other hand, as a result of the determination of step S430, if a captured calibration pattern is different from stored calibration patterns, that is, in case of pattern recognition failure, as illustrated in FIG. 5, a calibration result value for each of the calibration algorithms is calculated by using each of the calibration algorithms and the captured calibration pattern, and a calibration algorithm corresponding to a best calibration result value among the calculated calibration result values is selected (S510 and S520).

Herein, at step S520, a calibration algorithm with a smallest calibration error value among calibration error values included in a calibration result value may be selected.

When any one calibration algorithm is selected at step S520, camera calibration is performed by using the selected calibration algorithm and the captured calibration pattern, and thus a performance result of the camera calibration is provided (S530).

Furthermore, the camera calibration method according to an embodiment of the present disclosure determines a calibration pattern matching a stored calibration pattern as a captured case through step S430 of FIG. 4 but perform camera calibration also by selecting a calibration algorithm corresponding to a stored calibration pattern through a degree of similarity even when a captured calibration pattern is different from the stored calibration pattern. For example, even if a captured calibration pattern is different from a stored calibration pattern, the camera calibration method of the present disclosure may calculate a degree of similarity between the captured calibration pattern and each of a plurality of stored calibration patterns, recognize the captured calibration pattern as a calibration pattern with a highest degree of similarity among the calculated degrees of similarity, and perform camera calibration by using a calibration algorithm corresponding to the calibration pattern with the highest degree of similarity and the captured calibration pattern. Of course, in this case, some calibration errors may occur because camera calibration is performed by using a calibration algorithm with a highest degree of similarity to a different calibration pattern.

Although not described in the methods of FIG. 4 and FIG. 5, a method according to an embodiment of the present disclosure may include all the contents described in the apparatuses described in FIG. 1 to FIG. 3, and this may be clearly understood by those skilled in the art.

Figure 6:
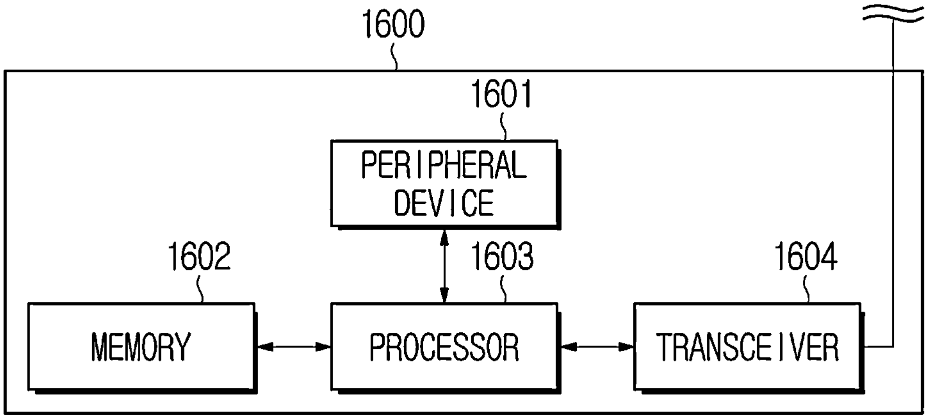
FIG. 6 shows a configuration of a device to which a camera calibration apparatus is applied according to an embodiment of the present disclosure.

FIG. 6 shows a configuration of a device to which a camera calibration apparatus is applied according to an embodiment of the present disclosure.

For example, the camera calibration apparatus according to an embodiment of the present disclosure in FIG. 1 may be a device 1600 of FIG. 6. Referring to FIG. 6, the device 1600 may include a memory 1602, a processor 1603, a transceiver 1604, and a peripheral device 1601. Also, as an example, the device 1600 may additionally include other components and is not limited to the above-described embodiment. Herein, for example, the device 1600 may be a mobile user terminal (e.g., a smartphone, a laptop computer, a wearable device, etc.) or a fixed management device (e.g., a server, a personal computer (PC), etc.).

More specifically, the device 1600 of FIG. 6 may be an exemplary hardware/software architecture such as a camera device, an intelligent image system, and CCTV Herein, as an example, the memory 1602 may be a non-removable memory or a removable memory. Also, as an example, the peripheral device 1601 may additionally include a display, GPS or other peripheral devices but is not limited to the above-described embodiment.

For example, the device 1600 may include a communication circuit, such as the transceiver 1604, and communicate with an external device on the basis of the communication circuit.

In addition, as an example, the processor 1603 may be at least one of a general processor, a digital signal processor (DSP), a DSP core, a controller, a microcontroller, application-specific integrated circuits (ASICs), field programmable gate array (FPGA) circuits, different types of arbitrary integrated circuits (ICs), and one or more microprocessors related to a state machine. In other words, the processor 1603 may be a hardware/software component for controlling the device 1600. Also, the processor 1603 may modularize and execute the above-described functions of the recognition unit 130, the selection unit 140 and the execution unit 150 of FIG. 1.

Herein, the processor 1603 may execute computer-executable instructions stored in the memory 1602 to implement various necessary functions of a camera calibration apparatus. As an example, the processor 1603 may control at least any one of signal coding, data processing, power control, input/output processing and a communication operation. Also, the processor 1603 may control a physical layer, a media access control (MAC) layer, and an application layer. Also, as an example, the processor 1603 may perform an authentication and security procedure on an access layer, the application layer, etc. and is not limited the above-described embodiment.

As an example, the processor 1603 may communicate with other devices through the transceiver 1604. As an example, the processor 1603 may control a camera calibration apparatus to perform communication with other devices via a network by executing computer-executable instructions. In other words, communication performed in the present disclosure may be controlled. As an example, the transceiver 1604 may transmit a radio frequency (RF) signal through an antenna and transmit a signal on the basis of various communication networks.

Also, as an example, as an antenna technology, a multiple-input multiple-output (MIMO) technology, beamforming, etc. may be used, and the antenna technology is not limited to the above-described embodiment. Also, a signal transmitted or received through the transceiver 1604 may be modulated or demodulated and controlled by the processor 1603 and is not limited to the above-described embodiment.

That is, when there is a drift, if the present disclosure is applied to restrict a gradient estimation error to a preset reference value or below, weight estimation and weight-adaptive vehicle control may be implemented within a lifetime.

While the methods of the present disclosure described above are represented as a series of operations for clarity of description, it is not intended to limit the order in which the steps are performed. The steps described above may be performed simultaneously or in different order as necessary. In order to implement the method according to the present disclosure, the described steps may further include different or other steps, may include remaining steps except for some of the steps, or may include other additional steps except for some of the steps.

The various examples of the present disclosure do not disclose a list of all possible combinations and are intended to describe representative aspects of the present disclosure. Aspects or features described in the various examples may be applied independently or in combination of two or more.

In addition, various examples of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed is:

1. A camera calibration apparatus comprising:
- one or more processors configured to:
- recognize a captured calibration pattern;
- select, among a plurality of preset calibration algorithms, a calibration algorithm corresponding to the recognized calibration pattern; and
- perform camera calibration by using the selected calibration algorithm and the captured calibration pattern,
- wherein the one or more processors are further configured to:
- calculate a degree of similarity between a plurality of pre-stored calibration patterns and the captured calibration pattern, and
- recognize a calibration pattern with a highest degree of similarity as the captured calibration pattern, and
- wherein the one or more processors are further configured to select a calibration algorithm corresponding to the calibration pattern with the highest degree of similarity.

2. The camera calibration apparatus of claim 1, wherein the one or more processors are further configured to:
- determine whether or not the calculated degree of similarity is equal to or greater than a preset reference degree of similarity, and
- when the calculated degree of similarity is equal to or greater than the preset reference degree of similarity, recognize the calibration pattern with the highest degree of similarity as the captured calibration pattern.

3. The camera calibration apparatus of claim 1, wherein the one or more processors are further configured to:
- extract a feature point of the captured calibration pattern,
- compare the extracted feature point and a feature point of each of the plurality of pre-stored calibration patterns, and
- recognize a most similar calibration pattern to the captured calibration pattern among the plurality of calibration patterns.

4. The camera calibration apparatus of claim 1, wherein the one or more processors are further configured to provide a performance result of the camera calibration.

5. A camera calibration apparatus comprising:
- one or more processors configured to:
- recognize a captured calibration pattern by comparing the captured calibration pattern and a plurality of pre-stored calibration patterns;
- calculate calibration result values for preset calibration algorithms respectively by using each of the calibration algorithms and the captured calibration pattern, when there is no calibration pattern corresponding to the captured calibration pattern in the plurality of calibration patterns;
- select a calibration algorithm corresponding to a smallest calibration error value among the calculated calibration result values; and
- perform camera calibration by using the selected calibration algorithm and the captured calibration pattern.

6. A camera calibration method comprising:
- recognizing a captured calibration pattern by comparing the captured calibration pattern and a plurality of pre-stored calibration patterns;
- selecting, among a plurality of preset calibration algorithms, a calibration algorithm corresponding to the recognized calibration pattern; and
- performing camera calibration by using the selected calibration algorithm and the captured calibration pattern,
- wherein the recognizing of the captured calibration calculates a degree of similarity between the plurality of calibration patterns and the captured calibration pattern and recognizes a calibration pattern with a highest degree of similarity as the captured calibration pattern.

7. The camera calibration method of claim 6, wherein the recognizing of the captured calibration extracts a feature point of the captured calibration pattern, compares the extracted feature point and a feature point of each of the plurality of calibration patterns, and thus recognizes a most similar calibration pattern to the captured calibration pattern among the plurality of calibration patterns.

8. The camera calibration method of claim 6, further comprising determining whether or not there is a calibration pattern corresponding to the captured calibration pattern among the plurality of calibration patterns,
- wherein the selecting of the calibration algorithm selects the calibration algorithm corresponding to the recognized calibration pattern, when the calibration pattern corresponding to the captured calibration pattern is present.

9. The camera calibration method of claim 8, further comprising:
- calculating calibration result values for the calibration algorithms respectively by using each of the calibration algorithms and the captured calibration pattern, when there is no calibration pattern corresponding to the captured calibration pattern;
- selecting a calibration algorithm corresponding to a smallest calibration error value among the calculated calibration result values; and
- performing camera calibration by using the calibration algorithm corresponding to the smallest calibration error value and the captured calibration pattern.

* * * * *